United States Patent
Treichel

(10) Patent No.: US 12,442,470 B2
(45) Date of Patent: *Oct. 14, 2025

(54) ARC RESISTANT CORRUGATED TUBING SYSTEM WITH PROTECTIVE JACKET AND FITTING

(71) Applicant: Omega Flex, Inc., Exton, PA (US)

(72) Inventor: Steven A. Treichel, West Chester, PA (US)

(73) Assignee: OMEGA FLEX, INC., Exton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,088

(22) Filed: Mar. 1, 2024

(65) Prior Publication Data
US 2024/0200694 A1    Jun. 20, 2024

Related U.S. Application Data

(63) Continuation of application No. 17/691,531, filed on Mar. 10, 2022, now Pat. No. 11,994,241.

(60) Provisional application No. 63/285,170, filed on Dec. 2, 2021.

(51) Int. Cl.
| | |
|---|---|
| *F16L 11/118* | (2006.01) |
| *F16L 11/11* | (2006.01) |
| *F16L 11/115* | (2006.01) |
| *F16L 25/00* | (2006.01) |

(52) U.S. Cl.
CPC ......... *F16L 11/1185* (2013.01); *F16L 11/111* (2013.01); *F16L 11/115* (2013.01); *F16L 25/0054* (2013.01)

(58) Field of Classification Search
CPC .... F16L 11/1185; F16L 11/111; F16L 11/115; F16L 25/0054
USPC ......................................... 138/109, 121, 122
See application file for complete search history.

(56) References Cited

U.S. PATENT DOCUMENTS

| | | |
|---|---|---|
| 2,657,364 A | 10/1953 | Carr |
| 3,311,133 A | 3/1967 | Kinander |
| 3,795,540 A | 3/1974 | Mildner |
| 3,940,718 A | 2/1976 | Vilkaitis |
| 4,147,185 A | 4/1979 | Hines |

(Continued)

FOREIGN PATENT DOCUMENTS

| | | |
|---|---|---|
| DE | 3140804 A1 | 4/1983 |
| DE | 4238605 C2 | 2/1995 |

(Continued)

OTHER PUBLICATIONS

Author Unknown, "Just the Facts Flash Shield", Gastite: The System is the Solution, Jan. 2015, 2 Pages.

(Continued)

*Primary Examiner* — David R Deal
(74) *Attorney, Agent, or Firm* — CANTOR COLBURN LLP

(57) ABSTRACT

A tubing apparatus includes corrugated tubing including convolutions of peaks and valleys; an electrically conductive or semi-conductive, polymer jacket disposed along an exterior length of the corrugated tubing; wherein the jacket includes a conductive material in an amount sufficient to protect the corrugated tubing from damage resulting from electrical arcing at levels of at least 9 coulombs at a waveform of 10 microseconds×1000 microseconds.

23 Claims, 7 Drawing Sheets

(56) References Cited

U.S. PATENT DOCUMENTS

| | | |
|---|---|---|
| 4,326,561 A | 4/1982 | Kutnyak |
| 4,334,121 A | 6/1982 | Kutnyak |
| 4,398,058 A | 8/1983 | Gerth et al. |
| 4,800,351 A | 1/1989 | Rampalli et al. |
| 5,011,880 A | 4/1991 | Cornibert et al. |
| 5,284,184 A | 2/1994 | Noone et al. |
| 5,413,147 A | 5/1995 | Moreiras et al. |
| 5,474,602 A | 12/1995 | Brown et al. |
| 5,622,210 A | 4/1997 | Crisman et al. |
| 5,799,989 A | 9/1998 | Albino |
| 5,960,977 A | 10/1999 | Ostrander et al. |
| 6,079,749 A | 6/2000 | Albino et al. |
| 6,276,728 B1 | 8/2001 | Treichel |
| 6,315,003 B1 | 11/2001 | Albino |
| 6,321,794 B1 | 11/2001 | Ishida et al. |
| 6,404,971 B2 | 6/2002 | Mehl |
| 6,428,052 B1 | 8/2002 | Albino et al. |
| 6,532,993 B2 | 3/2003 | Albino |
| 6,584,959 B2 | 7/2003 | Stieler |
| 6,682,796 B2 | 1/2004 | Ito et al. |
| 6,695,353 B1 | 2/2004 | Treichel |
| 7,044,167 B2 | 5/2006 | Rivest |
| 7,367,364 B2 | 5/2008 | Rivest et al. |
| 7,562,448 B2 | 7/2009 | Goodson |
| 7,821,763 B2 | 10/2010 | Goodson |
| 8,399,767 B2 | 3/2013 | Duquette et al. |
| 8,905,058 B2 | 12/2014 | Goodson |
| 8,905,083 B2 | 12/2014 | Strunk |
| 9,097,389 B2 | 8/2015 | Goodson |
| 9,249,904 B2 | 2/2016 | Duquette et al. |
| 9,445,486 B2 | 9/2016 | Duquette et al. |
| 9,494,263 B2 | 11/2016 | Mohri et al. |
| 10,024,469 B2 | 7/2018 | Strunk |
| 10,293,440 B2 | 5/2019 | Duquette et al. |
| 10,598,304 B2 | 3/2020 | Strunk |
| 11,480,272 B2 | 10/2022 | Strunk |
| 11,976,752 B2 | 5/2024 | Strunk |
| 11,994,241 B2 * | 5/2024 | Treichel ............... F16L 11/111 |
| 2002/0117226 A1 | 8/2002 | Malcarne |
| 2002/0185188 A1 | 12/2002 | Quigley et al. |
| 2003/0099799 A1 | 5/2003 | Koike et al. |
| 2004/0190841 A1 | 9/2004 | Anderson et al. |
| 2012/0152584 A1 | 6/2012 | Goodson |
| 2018/0003322 A1 | 1/2018 | Treichel |
| 2018/0065216 A1 | 3/2018 | Duquette et al. |
| 2023/0175615 A1 | 6/2023 | Treichel |

FOREIGN PATENT DOCUMENTS

| | | |
|---|---|---|
| DE | 4405409 C1 | 8/1995 |
| EP | 0813014 A2 | 12/1997 |
| EP | 2994684 B1 | 3/2016 |
| GB | 1505888 A | 4/1983 |
| JP | 2002174374 A | 6/2002 |
| WO | 9509999 A1 | 4/1983 |

OTHER PUBLICATIONS

Author Unknown; "Lightning Safety Recommendations for Gas Piping Systems"; CounterStrike and TracPipe by OmegaFlex, 2005, 2008, 2009 8 Pages.

Author Unknown; "Patented Protection Against Arcing From Lightning Strikes"; TracPipe®CounterStrike® White Paper; Nov. 2011; OmegaFlex; 7 Pages.

Author Unknown; "The FlashShield System"; Gastite, The System is the Solution; 2021; 4 Pages. https://www.gastite.com/us/products/flashshield.html.

Author Unknown; "The only gas piping that withstands fthe forces of Nature"; TracPipe®CounterStrike® Flexible Gas Piping by OmegaFlex, 2012, 2 Pages.

International Search Report and Written Opinion for Application No. PCT/US2022/050198; Issued Mar. 1, 2023; 16 Pages.

Torbin, Bob; "The Next Generation" OmegaFlex, Aug. 9, 2013, 5 Pages.

\* cited by examiner

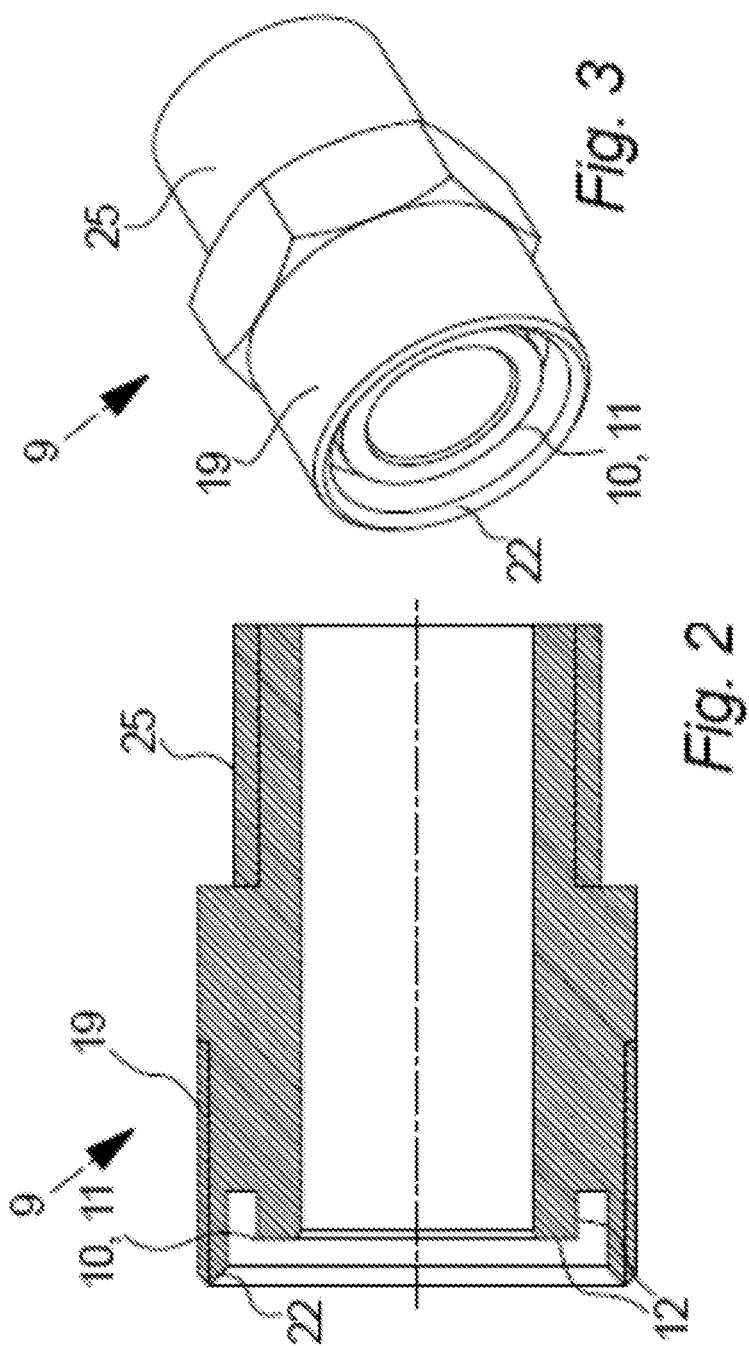

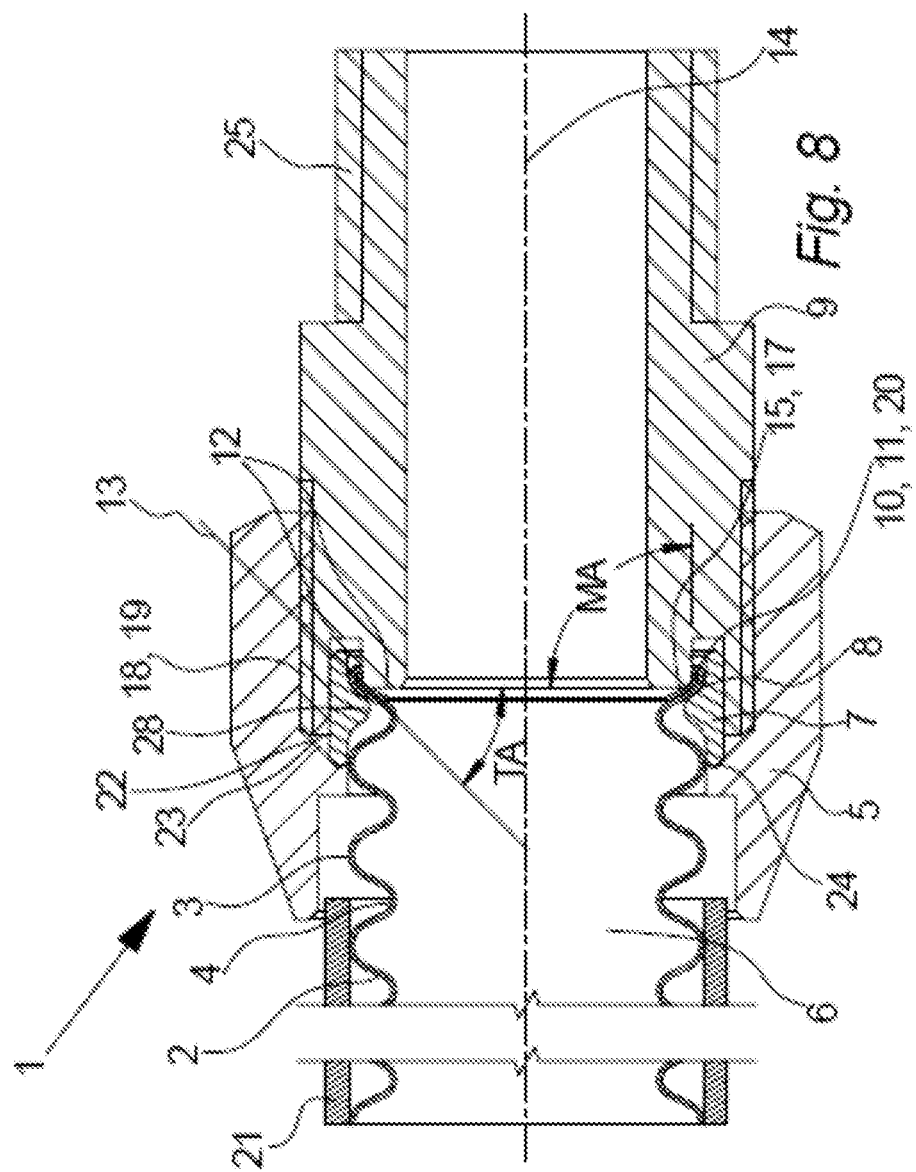

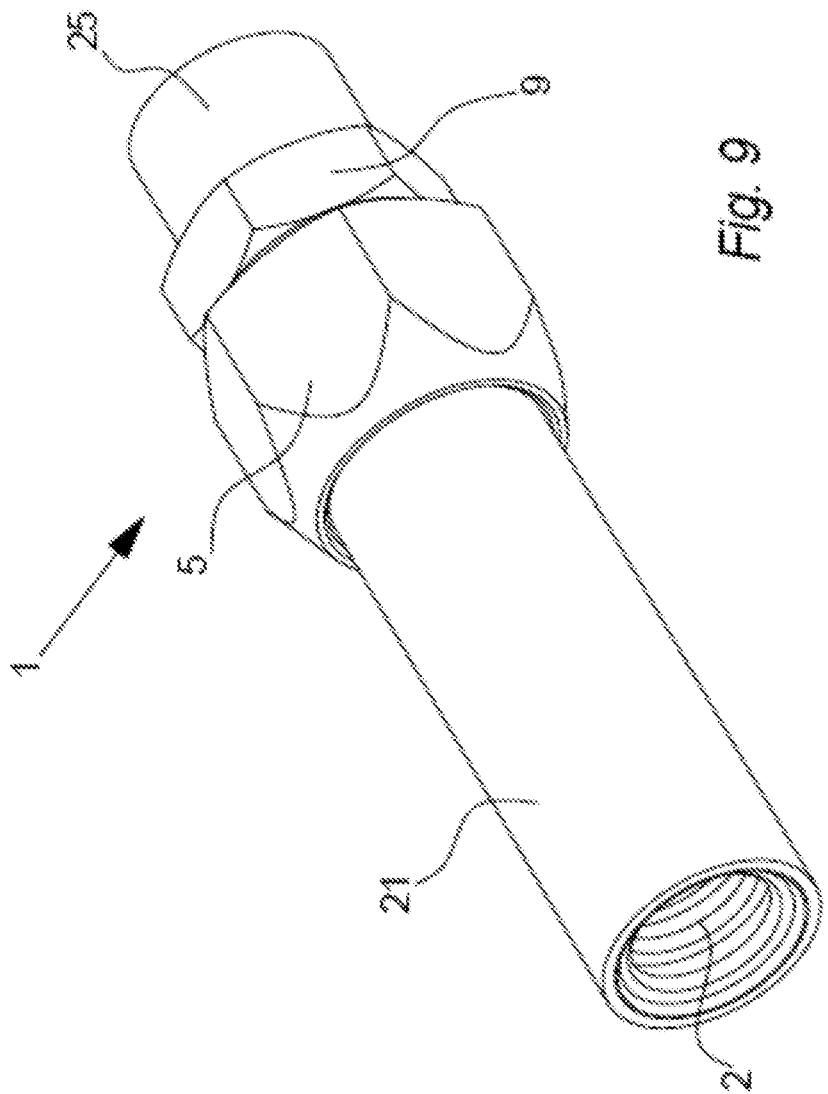

ARC RESISTANT CORRUGATED TUBING SYSTEM WITH PROTECTIVE JACKET AND FITTING

CROSS-REFERENCE TO RELATED APPLICATIONS

This application is a continuation of U.S. patent application Ser. No. 17/691,531, filed Mar. 10, 2022, which claims the benefit of U.S. provisional patent application No. 63/285,170, filed Dec. 2, 2021, the entire contents of which are incorporated herein by reference.

BACKGROUND

The subject matter disclosed herein relates generally to a corrugated tubing apparatus for carrying fluids, and more particularly to a corrugated tubing apparatus having an exterior jacket that protects an inner tubing from damage from electrical arcing.

Metal corrugated tubing or hose provides an alternative to rigid piping systems as a conduit for transporting fluids, such as natural gas or other fuel gases. The corrugated tubing can be easily installed and is useful in many system applications. Corrugated tubing allows for simpler, more cost-effective installation due to its uniquely flexible structure, corrosion resistance, and relatively high strength as compared to rigid tubing.

Existing corrugated tubing is often contained within an exterior jacket. In the event that the corrugated tubing experiences electrical charge buildup (e.g., from a lightning strike or other source), an electrical charge may seek a path to ground through the jacket to the inner metal tubing. In certain rare instances, the electrical charge may burn a small hole in the sidewall of the inner metal tubing, allowing any fluids conveyed within the tubing to escape.

SUMMARY

According to an embodiment, a tubing apparatus includes corrugated tubing including convolutions of peaks and valleys; an electrically conductive or semi-conductive polymer jacket disposed along the exterior length of the corrugated tubing; wherein the jacket includes a conductive material in an amount sufficient to protect the corrugated tubing from damage resulting from electrical arcing at levels of at least 9 coulombs at a waveform of 10 microseconds×1000 microseconds.

In addition to one or more of the features described herein, or as an alternative, further embodiments may include wherein the jacket provides protection to the corrugated tubing from damage resulting from electrical arcing at levels ranging from 9 coulombs to 15 coulombs at the waveform of 10 microseconds×1000 microseconds.

In addition to one or more of the features described herein, or as an alternative, further embodiments may include wherein the jacket further includes a fire retardant.

In addition to one or more of the features described herein, or as an alternative, further embodiments may include wherein the jacket has a thickness ranging from 1 mm to 5 mm.

In addition to one or more of the features described herein, or as an alternative, further embodiments may include wherein the jacket is extruded onto the corrugated tubing.

In addition to one or more of the features described herein, or as an alternative, further embodiments may include wherein the jacket comprises a single layer of material extruded onto the corrugated tubing.

In addition to one or more of the features described herein, or as an alternative, further embodiments may include wherein the jacket comprises two or more materials extruded or co-extruded onto the corrugated tubing and creating a single, homogenous layer.

In addition to one or more of the features described herein, or as an alternative, further embodiments may include wherein the jacket comprises two or more materials extruded or co-extruded onto the corrugated tubing and creating two or more layers within a single jacket.

In addition to one or more of the features described herein, or as an alternative, further embodiments may include wherein the jacket has a low temperature embrittleness resistance to −20 degrees C. in accordance with ASTM D746 Standard.

In addition to one or more of the features described herein, or as an alternative, further embodiments may include wherein the jacket has a hardness of Shore A 90 to Shore D 60.

In addition to one or more of the features described herein, or as an alternative, further embodiments may include wherein the jacket includes a thermoplastic compound in an amount of 30% to 60% by weight, the conductive material in an amount of 3% to 12% by weight and a fire retardant in an amount of 35% to 55% by weight.

According to another embodiment, a system includes corrugated tubing including convolutions of peaks and valleys; an electrically conductive or semi-conductive, polymer jacket disposed along an exterior length of the corrugated tubing, the jacket including a conductive material in an amount sufficient to protect the corrugated tubing from damage resulting from electrical arcing at levels of at least 9 coulombs at a waveform of 10 microseconds×1000 microseconds; a fitting secured to the corrugated tubing; the fitting including a pocket for receiving the jacket.

In addition to one or more of the features described herein, or as an alternative, further embodiments may include wherein the jacket provides protection to the corrugated tubing from damage resulting from electrical arcing at levels ranging from 9 coulombs to 15 coulombs at the waveform of 10 microseconds×1000 microseconds.

In addition to one or more of the features described herein, or as an alternative, further embodiments may include wherein the fitting includes a pocket for receiving the jacket.

In addition to one or more of the features described herein, or as an alternative, further embodiments may include a nut having a passage therethrough for receiving the corrugated tubing; at least one gap ring arranged in the nut, the gap ring having a sealing surface for placement in a valley of the corrugated tubing, and a body having a pointed annular body sealing edge arranged so that the apex of the body sealing edge is pressed against the gap ring sealing surface when the nut and the body are directed towards each other.

In addition to one or more of the features described herein, or as an alternative, further embodiments may include wherein the pointed annular body sealing edge is formed along the edge of two abutting body surfaces, wherein a mutual angle (MA) between the abutting body surfaces is between 10° and 170°.

In addition to one or more of the features described herein, or as an alternative, further embodiments may include wherein a tangent angle (TA) between the body surfaces and a tangent through the gap ring sealing surface at the body sealing edge, when the fitting is sealing corrugated tubing, is between 10° and 80°.

In addition to one or more of the features described herein, or as an alternative, further embodiments may include wherein one of the body surfaces is substantially perpendicular to a longitudinal center axis of the fitting.

In addition to one or more of the features described herein, or as an alternative, further embodiments may include wherein the sealing surface is concave.

In addition to one or more of the features described herein, or as an alternative, further embodiments may include wherein the pointed annular body sealing edge is arranged to form a substantially linear metal-to-metal seal at an end of the corrugated tubing.

In addition to one or more of the features described herein, or as an alternative, further embodiments may include wherein the system meets the requirements set forth in ANSI LC-1 for fuel gas piping systems using corrugated stainless steel tubing.

Technical effects of embodiments include providing tubing apparatus including corrugated, metal tubing having an arc-resistant jacket positioned on the outside of the corrugated, metal tubing. A fitting for use with the tubing apparatus is also provided.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings.

FIG. 2 illustrates a cross section through the middle of a body according to an example embodiment, as seen from the side.

FIG. 3 illustrates a body according to an example embodiment, as seen in perspective.

FIG. 8 illustrates a cross section through the middle of a closed fitting according to an example embodiment, as seen from the side.

FIG. 9 illustrates a closed fitting according to an example embodiment, as seen in perspective.

DETAILED DESCRIPTION

Figure 10:
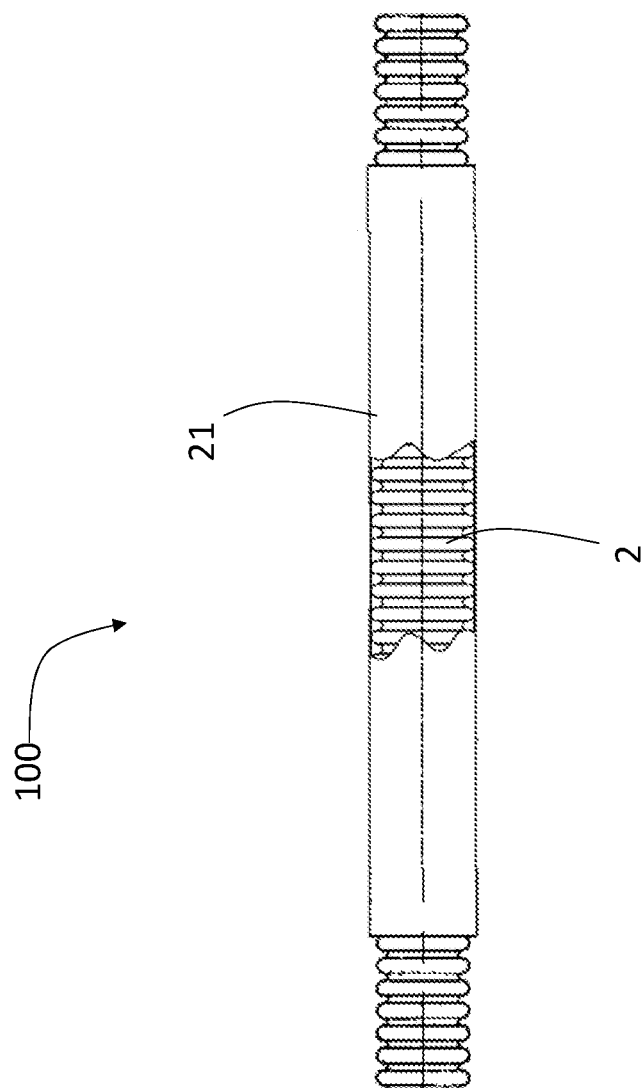
FIG. 10 is a side view, in partial cross-section, of a corrugated tubing apparatus with an arc-resistant jacket according to an example embodiment.

FIG. 10 is a side view, in partial cross-section, of an arc-resistant tubing apparatus 100. The tubing apparatus 100 includes tubing 2 and an exterior electrically conductive or semi-conductive jacket 21. The tubing 2 may be annular, corrugated stainless steel tubing (CSST) for transporting fluids such as natural gas, liquids, etc. Alternatively, the tubing 2 may be helically wound corrugated tubing. The tubing 2 may be made from metals other than stainless steel.

An arc-resistant jacket 21 is applied over the corrugated tubing 2. As used herein, unless specified otherwise, arc-resistant refers to the ability of the jacket 21 to distribute an electrical charge over an extended area of the jacket 21, and then transfer electrical charge to the tubing and then to the building's electrical grounding system. This prevents or reduces the ability of the electrical charge from penetrating the jacket and entering the tubing in a pinpoint manner and protecting the metal tubing from damage. Damage to the tubing 2 includes a hole in the tubing 2 allowing the fluid to leak.

The corrugated tubing 2 has an exterior surface and an interior surface. The interior surface is typically exposed to the working fluid. The corrugated tubing 2 comprises a structure that has varying diameters or convolutions that form peaks 3 and valleys 4 (FIG. 1) in alternating annular series or helical spirals along the length of the corrugated tubing 2. The exterior surface is used as the reference for the peak 3 and valley 4 as opposed to the interior surface. The peaks 3 corresponds to the larger outside diameter and the valleys 4 corresponds to the smaller outside diameter.

The jacket 21 is disposed on the exterior surface of the corrugated tubing 2. The jacket 21 may substantially fill the valleys 4 and cover the peaks 3 on the exterior surface. The jacket 21 is disposed along the length of the corrugated tubing 2. The material makeup of the jacket 21 has properties that resist forces that distort the tubing 2 such as tension and shear forces. As a result, when the internal pressure of a working fluid increases and acts to spread apart the corrugated tubing 2, the jacket 21 disposed in the valleys 4 resists the forces that are created inside the tubing. The jacket 21 inhibits the expansion or spreading of the corrugated tubing 2 such that the corrugated tubing 2 does not significantly distort either in the linear dimension or the diameter of the corrugated tubing 2. The jacket 21 supports each convolution of the corrugated tubing 2. As the corrugated tubing 2 is bent and flexed along its length, the jacket 21 bends and flexes with the corrugated tubing 2.

The thickness of the jacket 21 can be varied to enhance resistance to tubing expansion or to provide more or less flexibility to the corrugated tubing 2. A variety of pressure ratings can be met by changing the thickness of the jacket 21. A direct relationship exists between the thickness of the jacket 21 and the pressure rating of the corrugated tubing 2. Applying a jacket 21 to the corrugated tubing 2 increases the pressure rating of the corrugated tubing 21 above the pressure rating of the corrugated tubing 2 without a jacket 21. The jacket 21 also increases the number of flex cycles required to create metal fatigue failure in the corrugated tubing 2 and attenuates vibration to reduce failure of corrugated tubing 2 due to vibration fatigue.

The jacket 21 can be applied to the corrugated tubing 2 using a variety of techniques such as extrusion, powder coating, spraying, dipping, compression molding, etc. In one embodiment, the jacket 21 substantially fills valleys 4 and covers peaks 3. In an extrusion application, as the jacket 21 is extruded it is substantially molten and flows down into the corrugations of the corrugated tubing 2. The molten jacket 21 cools on the corrugated tubing 2. The molten material substantially fills the valleys and covers the peaks. In an alternate embodiment, a polymer jacket 21 is extruded down into the corrugations and then cured (e.g., through heat).

In an alternate embodiment, the jacket 21 is extruded over the corrugated tubing 2, but not driven into the valleys of the corrugated tubing. The jacket 21 covers the peaks of the corrugated tubing 2 but is not driven into the valleys.

The jacket 21 may be formed by a single extrusion of a single layer of a single material applied onto the outer surface of corrugated tubing 2. In another embodiment, the jacket 21 is made from two materials that are simultaneously co-extruded onto the outer surface of the corrugated tubing 2. In a co-extruded embodiment, two or more materials are simultaneously extruded onto the outer surface of the corrugated tubing 2 to create a single, homogenous layer. In another embodiment, the jacket 21 is made from two or more different materials that are simultaneously co-extruded onto the outer surface of the corrugated tubing 2, where the materials create two or more layers within the single jacket component, with those layers having different mechanical, chemical or electrical properties. The two or more materials may be made from different polymers and have different physical and electrical properties.

The jacket 21 may be applied so that the electrically conductive or semi-conductive jacket 21 bonds to substantially the entire exterior surface of the corrugated tubing 2. The optional bonding of the jacket 21 to the exterior surface can be mechanical bonding or chemical bonding such that jacket 21 substantially adheres to the exterior surface of the corrugated tubing 2. Also, by being located in the valleys, the jacket 21 mechanically blocks the deformation of the corrugated tubing 2 as a result of the material properties of the jacket 21. With the jacket 21 applied such that there is an adhesion between the jacket 21 and the surface of the corrugated tubing 2, there is no relative motion between the jacket 21 and the surface of the corrugated tubing 2.

The jacket 21 may be made from a thermoplastic polymer such as a polyethylene compound. The jacket 21 may be electrically conductive or electrically semi-conductive. Other thermoplastics may be used for jacket 21, and the invention is not limited to polyethylene. The jacket 21 may be made from polypropylene, polyurethane, etc. Electrically conductive materials may be incorporated with the thermoplastic polymer to achieve desired charge dissipation. In an example embodiment, the jacket 21 includes a thermoplastic resin, a conductive material (e.g., carbon) and a fire retardant. In an example embodiment, the jacket 21 includes a thermoplastic compound in an amount of 30% to 60% by weight, an electrically conductive carbon in an amount of 3% to 12% by weight and a fire retardant in an amount of 35% to 55% by weight.

Since the jacket 21 is made from an electrically conductive or semi-conductive thermoplastic compound, an electrical charge arcing to jacket 21 from excessive charge with sufficient voltage (e.g., a lightning strike) is dispersed over a wide area through the length and depth of jacket 21. The amount of the arcing electrical charge is reduced and dispersed when it comes into contact with the tubing 2, and that the remaining electrical charge is conducted along the length of tubing 2 and then to the end fittings 1 (FIG. 1) and through components connected to fittings 1, and then to ground via piping connected to the fittings 1.

In an embodiment, the jacket 21 provides resistance to damage to tubing 2 from electrical arcing at levels of at least 9 coulombs at a waveform of 10 microseconds×1000 microseconds, including waveform values that fall within acceptable industry variations or tolerances. The 10 microseconds× 1000 microseconds waveform is considered by lightning experts to represent a worst case for indirect strikes into a building. In another embodiment, the jacket 21 provides resistance to electrical arcing at levels ranging from 9 coulombs to 15 coulombs at a waveform of 10 microseconds×1000 microseconds, including waveform values that fall within acceptable industry variations or tolerances. The waveform of 10 microseconds×1000 microseconds corresponds to a lightning test waveform. The 10 μs/1000 μs specifies that the current rises from 10% to 90% of peak in 10 μs and then decays to 50% of its peak in 1000 μs. The at least 9 coulombs value provides for improved dissipation of electrical charge by the jacket 21.

In an embodiment, the tubing apparatus 100 has a percent elongation greater than 200%. In another embodiment, the tubing apparatus 100 has a percent elongation ranging from 200% to 600%. In an embodiment, the tubing apparatus 100 has greater than 1000 PSI tensile strength. In an embodiment, the jacket 21 has a variable electrical resistivity, which may vary between the inner surface and outer surface of the jacket 21. In an embodiment, the jacket 21 has low temperature embrittleness resistance to −20 degrees C. in accordance with ASTM D746 Standard. In an embodiment, the jacket 21 has a hardness of Shore A 90 to Shore D 60.

The thickness of jacket 21 may range from 1 mm to 5 mm based on the polymers used. Thicker jackets may be used to provide additional protection from electrical arcing and external forces (e.g., tearing, abrasion and wear). The thickness of jacket 21 is measured from the top of a peak 3 to the outer surface of jacket 21.

In alternate embodiments, one or more fire retardants may be incorporated into the jacket 21 material. The fire retardant may allow the tubing apparatus to meet or exceed various standards. For example, embodiments of the invention include fire retardants in an amount sufficient for the tubing apparatus to pass existing smoke density and flame spread tests. Example fire retardant material types and amount by weight include nitrogen/phosphorus at 40% to 60%; brominated at 10% to 20%; chlorinated at 30% to 50%, magnesium hydroxide at 40% to 60% and aluminum trihydrate at 40% to 60%.

Figure 1:
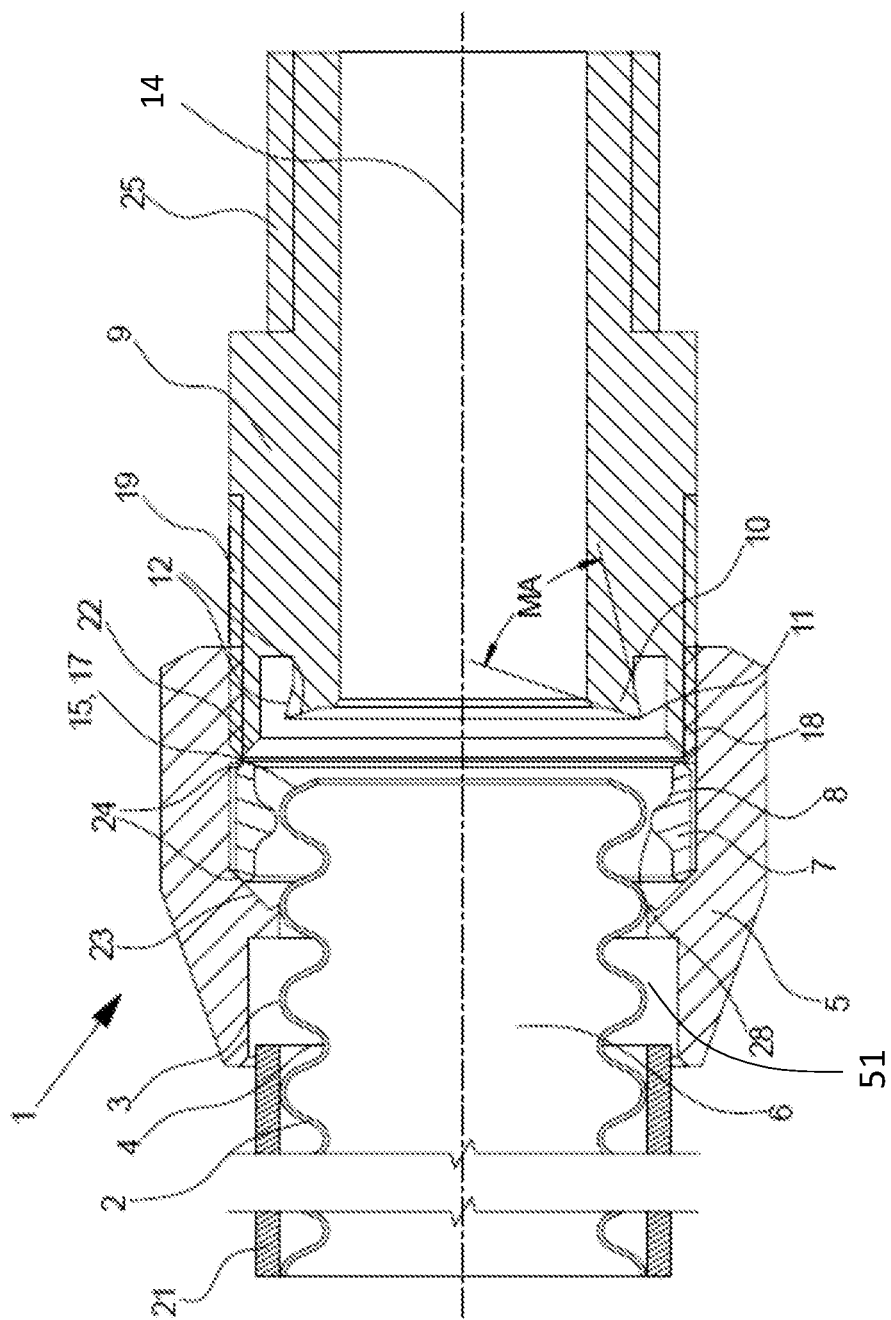
FIG. 1 illustrates a cross section through the middle of a fitting according to an example embodiment before a seal has been formed, as seen from the side.

FIG. 1 is an example of a fitting 1 for use with the tubing 2. FIG. 1 illustrates a cross section through the middle of the fitting 1 before a seal 20 (FIG. 8) has been formed. In FIG. 1 corrugated tubing 2 is being arranged in the fitting 1 but is has not yet been pushed all the way into the fitting 1 so that the end 17 of the tubing 2 is pushed against a body surface 12 of the body 9. Typically the gap ring 7 is arranged in the nut 5 and the nut 5 is mounted on the body 9 when the fitting 1 is supplied to the user. In this embodiment the inner diameter of the gap ring 7 is slightly smaller than the outer diameter of the peaks 3 of the corrugated tubing 2 so that when the user mounts the fitting 1 on a corrugated tubing 2 the user simply places the tubing 2 into the passage 6 through the nut 5 and pushes it forward so that the first peak 6 on the corrugated tubing 2 will engage the gap ring protrusion 28 of the gap ring 7 and push the gap ring 7 outwards. As the corrugated tubing 2 moves forward the gap ring 7 snaps into place in the valley 4 succeeding the first peak 3. Thereby it is ensured that the fitting stays in place on the corrugated tubing 2 during succeeding operations.

Figure 7:
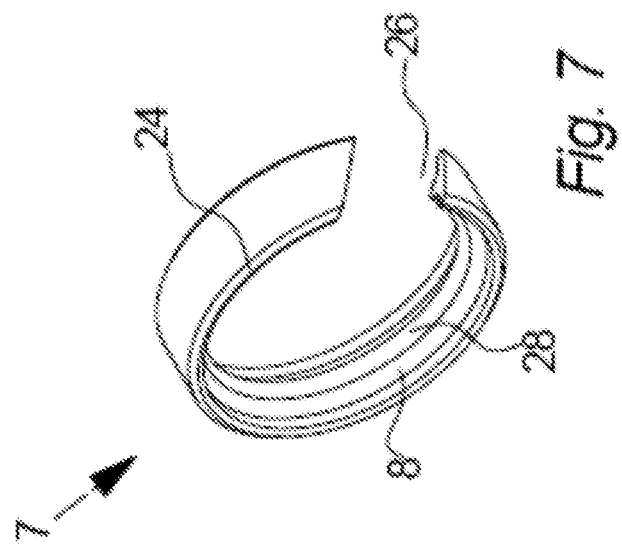
FIG. 7 illustrates a gap ring according to an example embodiment, as seen in perspective.

However, in another embodiment the inner diameter of the gap ring 7 could be bigger than the outer diameter of the corrugated tubing 2 and so that the corrugated tubing 2 easily may be passed through the gap ring 7 arranged in the nut 5 (see also FIG. 7).

Once the corrugated tubing 2 is positioned correctly inside the fitting 1 the body 9 and the nut 5 are forced towards each other whereby the geometry of the body 9 and the nut 5 will force the gap ring 7 inwards—thus reducing the diameter of the gap ring 7. In this embodiment this geometry of the body 9 and the nut 5 includes a sloping front surface 22 of the body 9 and a sloping gap ring surface 23 of the nut 5 arranged to engage matching sloping side surfaces 24 on the gap ring 7 so that when the body front surface 22 and the gap ring surface 23 are forced towards each other, they will engage the side surfaces 24 of the gap ring 7 and push the gap ring 7 inwards to reduce its diameter and force the gap ring 7 into a valley 4 of the corrugated tubing 2.

As explained above forming the gap ring 7 with a slightly smaller inner diameter than the outer diameter of the corrugated tubing 2 ensures that the gap ring protrusion 28 of the gap ring 7 protrudes into a valley 4 of the corrugated tubing 2 and ensures that the gap ring remains correctly placed in relation to the peaks 3 and valleys 4 of the corrugated tubing 2 while a user e.g. finds and mounts fitting tools to perform the action of forcing body 9 and the nut 5 towards each other.

However, in another embodiment only the nut 5 or only the body 9 would be provided with a sloping surface forcing the gap ring 7 inwards or the gap ring 7 would be forced inwards by other means e.g. arranged outside the gap ring 7 so that these other means would impact on the gap ring 7.

In this embodiment the nut 5 is provided with internal thread 18 matching the external thread 19 of the body 9 so that when one of these parts 5, 9 is rotated in relation to the other the meshing thread 18, 19 will force the parts 5, 9 towards or away from each other depending of the direction of rotation.

However, in another embodiment the body 9 could be provided with internal thread matching external thread on the nut 5, one or both of the nut 5 and the body 9 could be provided with a clamping device capable of forcing the parts 5, 9 together around the end 17 of the corrugated tubing 2 to form a tight seal 20 or the nut 5 and the body 9 could be designed to be forced together—and locked in a closed position—by means of an external tool or device.

As previously explained the fitting 1 is in this embodiment shown in an open state but when the corrugated tubing 2 is arranged against the body 9 and the nut 5 and the body 9 are forced towards each other, the gap ring 7 will force the last corrugation of the corrugated tubing 2 forward so that it is pressed against the apex 11 of a pointed annular body sealing surface 10 formed at the end of the body 9 so that a tight seal 20 can be formed between the corrugated tubing 2 and the fitting 1.

In this embodiment the pointed annular body sealing edge 10 is formed along the edge of two abutting body surfaces 12 having a mutual angle MA of approximately 90° but in another embodiment the mutual angle MA could be either more acute or more obtuse, such as 80°, 100° or other.

In this embodiment the body surface 12 closest to the centre of the fitting 1 is arranged in an angle of approximately 70° in relation to the centre axis 14, but in another embodiment this body surface 12 could be arranged in an angle ranging from of 60° to 100° or other, or this body surface 12 could be arranged substantially perpendicular to the longitudinal center axis 14 of the fitting 1 as disclosed in FIGS. 2 and 8.

In this embodiment the apex 11 of the pointed annular body sealing edge 10 is rounded to prevent the apex 11 from cutting into the corrugated tubing 2 and potentially compromise the seal 20 and to increase the durability of the apex 11. However, in another embodiment the apex 11 could be rounded more e.g. if the mutual angle MA of the body surfaces 12 was smaller or the apex 11 could be rounded less or not at all e.g. if the mutual angle MA was larger.

In this embodiment the nut 5, the gap ring 7 and the body 9 are all made from machined brass but in another embodiment one or more of these parts 5, 7, 9 could at least partly be made by casting and/or one or more of these parts 5, 7, 9 could be made from another metal such as steel, stainless steel, copper or other or they could be made from another material, or any combination thereof.

In this embodiment the corrugated tubing 2 is a corrugated stainless steel tubing (CSST) but in another embodiment the corrugated tubing 2 could be made from another material such as copper, aluminum, some sort of alloy or it could be made from another material, or any combination thereof.

FIG. 2 illustrates a cross section through the middle of a body 9, as seen from the side and FIG. 3 illustrates a body 9, as seen in perspective. In this embodiment a central part of the body 9 is formed hexagonally enabling that the body 9 may be rotated by means of some kind of spanner while being connected to the nut 5.

As previously discussed in this embodiment one end of the body 5 is provided with external thread 19 enabling that the body 9 may be screwed into the nut 5. However, in this embodiment the other end of the body 9 is also provided with a standardized utility external thread 25 enabling that corrugated tubing 2 provided with a fitting 1 may be connected to further devices provided with a matching standardized connector. In this embodiment the utility external thread 25 is ½" but corrugated tubing 2, the fitting and particularly the utility external thread 25 could obviously be made either larger or smaller to e.g. fit a specific use.

Figure 5:
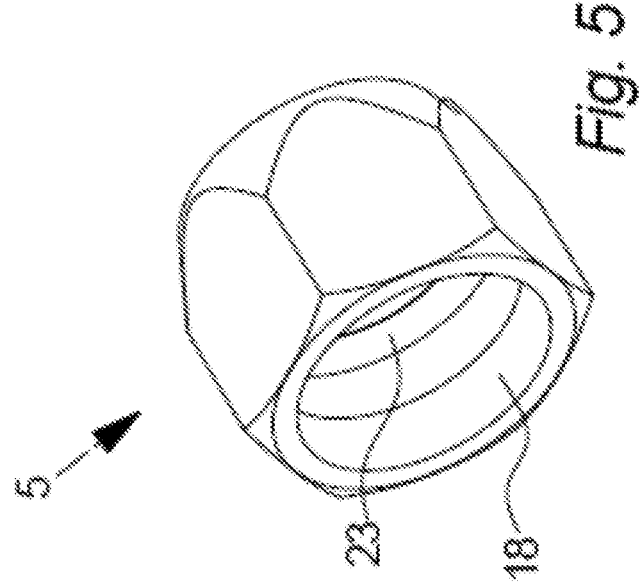
FIG. 5 illustrates a nut according to an example embodiment, as seen in perspective.
Figure 4:
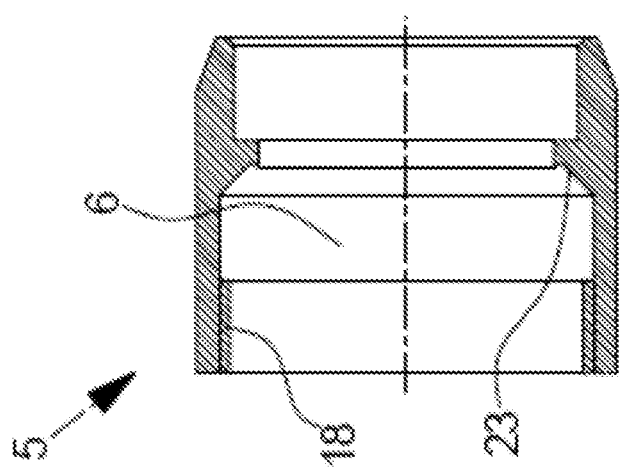
FIG. 4 illustrates a cross section through the middle of a nut according to an example embodiment, as seen from the side.

FIG. 4 illustrates a cross section through the middle of a nut 5, as seen from the side and FIG. 5 illustrates a nut 5, as seen in perspective. In this embodiment the outside of the nut 5 is formed hexagonally enabling that the nut 5 may be rotated by means of some kind of spanner while being connected to the body 9.

Figure 6:
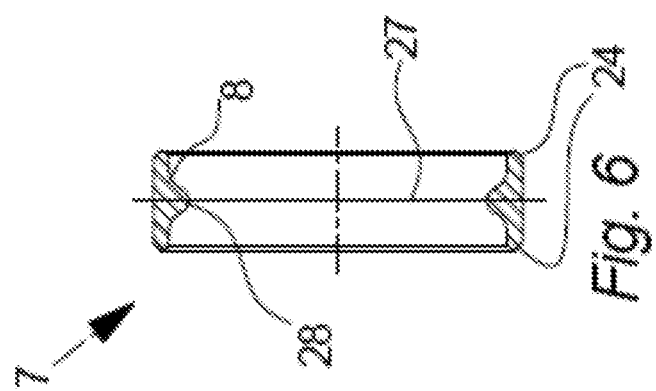
FIG. 6 illustrates a cross section through the middle of a gap ring according to an example embodiment, as seen from the side.

FIG. 6 illustrates a cross section through the middle of a gap ring 7, as seen from the side and FIG. 7 illustrates a gap ring 7, as seen in perspective.

As previously discussed the gap ring 7 is forced inwards so that the diameter of the gap ring 7 is reduced when the nut 5 and the body 9 are forced towards each other and the diameter of the gap ring 7 is increased when the corrugated tubing 2 is pushed through the gap ring 7. To allow this diameter variation of the gap ring 7, the gap ring 7 is by default provided with a wide slit 26. The width of this slit 26 will gradually change as the diameter of the gap ring 7 is changed. To allow that the gap ring 7 snaps back to its original diameter when the corrugated tubing 2 is pushed through the gap ring 7 the gap ring is in this embodiment made from brass which is sufficiently flexible to allow this functionality.

In this embodiment the gap ring 7 is initially formed so that the width of the slit 26 is substantially zero when the fitting 1 is fully closed—thus enabling that the gap ring 7 will press all the way around the end 17 of the corrugated tubing 2. However, it is obvious to the skilled person that a tight seal 20 can also be achieved even if the gap ring 7 is not pressing all the way around the end 17 of the corrugated tubing 2.

In this embodiment the gap ring 7 is substantially symmetrical around a plane 16 through the middle of the gap ring 7, wherein this plane 16 is perpendicular to the centre axis 27 of the gap ring 7 and thus also to the longitudinal centre axis 14 of the fitting 1 when the gap ring 7 is in use in the fitting 1. However, in another embodiment the gap ring 7 could be formed asymmetrically.

FIG. 8 illustrates a cross section through the middle of a closed fitting 1, as seen from the side and FIG. 9 illustrates a closed fitting 1, as seen in perspective. In this embodiment the end 17 of the corrugated tubing 2 is completely compressed between the apex 11 of the body sealing edge 10 and the gap ring sealing surface 8 of the gap ring 7. As the nut 5 and body 9 are forced together and the diameter of the gap ring 7 is reduced the gap ring 7 will extend down into the valley 4 laying in front and the gap ring sealing surface 8 will push at least the last corrugation of the corrugated tubing 2 forwards and against the apex 11 of the body sealing edge 10 so that this corrugation is deformed and compressed between the apex 11 of the body sealing edge 10 and the gap ring sealing surface 8.

In this embodiment the gap ring sealing surface 8 is concave but in another embodiment the sealing surface 8 could be formed convex, flat or it could be formed with a more complex surface contour.

In this embodiment the tangent angle TA between the body surfaces 12 and a tangent 13 through the gap ring sealing surface 8 at the centre point where the body sealing edge 10 engages the corrugated tubing 2—i.e. at the apex 11—is around 45° and in the embodiment disclosed in FIG. 1 it would be around 60° but this angle TA could obviously be both larger or smaller e.g. depending in the specific design of the gap ring sealing surface 8, the body sealing edge 10 or other. In this embodiment the body sealing edge 10 is arranged to press into the side 15 of the corrugation at the end 17 of the corrugated tubing 2 but in another embodiment the body sealing edge 10 could be arranged to press at the peak 3 or at the bottom of the valley 4 of this corrugation.

The pointed design of the body sealing edge 10 entails that a substantially linear annular seal 20 (also referred to as a line seal) is formed along the annular apex 11 of the body sealing edge 10 at the end 17 of the corrugated tubing 2. In this embodiment this seal is around 2 mm wide but in another embodiment the seal 20 could be wider or narrower particularly depending on the specific design of the body sealing edge 10 and especially the specific design of the apex 11 of the body sealing edge 10 or e.g. depending on the specific corrugated tubing 2, the design of the gap ring 7 and/or other. The fitting 1 creates a metal-to-metal seal with the corrugated tubing 2 compressed between the gap ring sealing surface 8 and the body sealing edge 10. This metal-to-metal seal eliminates the need for gaskets that can fail, particularly in high temperature environments.

The fitting 1 includes a pocket 51 (FIG. 1) on a rear end of nut 5 to accept jacket 21 to provide for a positive arc gap for electrical energy to ground through the fitting 1. The pocket 51 has an inner diameter sized to accept the outer diameter of jacket 21 to provide a small electrical arc gap between the jacket 21 and the fitting 1. Any charge accumulated on the jacket 21 is conducted to the fitting 1 and then ground through the existing gas piping attached to fitting 1. The fitting 1 is electrically conductive and is resistant to a higher level of electrical energy than the tubing 2 and jacket 21.

The fitting 1 may be impact resistant without leakage to 30 ft./lbs. The fitting may be fire resistant without leakage to 1000 degrees F. for 1 hour. The fitting 1 may resist leakage or loosening from ⅛" amplitude vibration under tensile and torsional load for 30 consecutive hours. The fitting 1 may be resistant to leakage or separation from corrugated tubing 2 under tensile load of 800 lb/in$^2$ per inch of fitting inside diameter.

The tubing apparatus may be used in a number of applications including residential or commercial, interior or exterior, and aboveground or underground installations.

The numerical values in this application are intended to include the degree of error associated with measurement of the particular value based upon the equipment available at the time of filing this application and/or manufacturing tolerances for the particular value using manufacturing techniques available at the time of filing this application and/or acceptable industry variations or tolerances for the particular value at the time of filing this application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, values, steps, operations, elements, and/or components, but do not preclude the presence or addition of one or more other features, values, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A tubing apparatus comprising:
   corrugated tubing including convolutions of peaks and valleys;
   an electrically conductive or semi-conductive polymer jacket disposed along an exterior length of the corrugated tubing;
   wherein the jacket includes a conductive material in an amount sufficient to protect the corrugated tubing from damage resulting from electrical arcing at levels of at least 9 coulombs at a waveform of 10 microseconds× 1000 microseconds.

2. The tubing apparatus of claim 1, wherein the jacket provides protection to the corrugated tubing from damage resulting from electrical arcing at levels ranging from 9 coulombs to 15 coulombs at the waveform of 10 microseconds×1000 microseconds.

3. The tubing apparatus of claim 1, wherein the jacket further includes a fire retardant.

4. The tubing apparatus of claim 1, wherein the jacket has a thickness ranging from 1 mm to 5 mm.

5. The tubing apparatus of claim 1, wherein the jacket is extruded onto the corrugated tubing.

6. The tubing apparatus of claim 5, wherein the jacket comprises a single layer of material extruded onto the corrugated tubing.

7. The tubing apparatus of claim 5, wherein the jacket comprises two or more materials co-extruded onto the corrugated tubing and creating a single, homogenous layer.

8. The tubing apparatus of claim 1, wherein the jacket comprises two or more materials extruded or co-extruded onto the corrugated tubing and creating two or more layers within a single jacket.

9. The tubing apparatus of claim 8, wherein the two or more layers within the single jacket have different resistivity.

10. The tubing apparatus of claim 8, wherein the two or more layers within the single jacket have different mechanical, chemical or electrical properties.

11. The tubing apparatus of claim 1, wherein the jacket has a low temperature embrittleness resistance to −20 degrees C. in accordance with ASTM D746 Standard.

12. The tubing apparatus of claim 1, wherein the jacket has a hardness of Shore A 90 to Shore D 60.

13. The tubing apparatus of claim 1, wherein the jacket includes a thermoplastic compound in an amount of 30% to 60% by weight, the conductive material in an amount of 3% to 12% by weight and a fire retardant in an amount of 35% to 55% by weight.

14. A system comprising:
corrugated tubing including convolutions of peaks and valleys;
an electrically conductive or semi-conductive, polymer jacket disposed along an exterior length of the corrugated tubing, wherein the jacket includes a conductive material in an amount sufficient to protect the corrugated tubing from damage resulting from electrical arcing at levels of at least 9 coulombs at a waveform of 10 microseconds×1000 microseconds;
a fitting securable to the corrugated tubing.

15. The system of claim 14, wherein the jacket provides protection to the corrugated tubing from damage resulting from electrical arcing at levels ranging from 9 coulombs to 15 coulombs at the waveform of 10 microseconds×1000 microseconds.

16. The system of claim 14, wherein the fitting includes a pocket for receiving the jacket.

17. The system of claim 14 wherein the fitting comprises:
a nut having a passage therethrough for receiving the corrugated tubing;
at least one gap ring arranged in the nut, the gap ring having a sealing surface for placement in a valley of the corrugated tubing, and
a body having a pointed annular body sealing edge arranged so that the apex of the body sealing edge is pressed against the gap ring sealing surface when the nut and the body are directed towards each other.

18. The system of claim 17, wherein the pointed annular body sealing edge is formed along the edge of two abutting body surfaces, wherein a mutual angle (MA) between the abutting body surfaces is between 10° and 170°.

19. The system of claim 18, wherein a tangent angle (TA) between the body surfaces and a tangent through the gap ring sealing surface at the body sealing edge, when the fitting is sealing corrugated tubing, is between 10° and 80°.

20. The system of claim 18, wherein one of the body surfaces is substantially perpendicular to a longitudinal center axis of the fitting.

21. The system of claim 17, wherein the sealing surface is concave.

22. The system of claim 17, wherein the pointed annular body sealing edge is arranged to form a substantially linear metal-to-metal seal at an end of the corrugated tubing.

23. The system of claim 14, wherein the system meets the requirements set forth in ANSI LC-1 for fuel gas piping systems using corrugated stainless steel tubing.

* * * * *